(12) United States Patent
Koizumi et al.

(10) Patent No.: US 11,255,004 B2
(45) Date of Patent: Feb. 22, 2022

(54) STAINLESS STEEL

(71) Applicant: HONDA MOTOR CO., LTD., Tokyo (JP)

(72) Inventors: Atsushi Koizumi, Wako (JP); Yuichi Ienaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 16/099,266

(22) PCT Filed: Dec. 27, 2016

(86) PCT No.: PCT/JP2016/088842
§ 371 (c)(1),
(2) Date: Nov. 6, 2018

(87) PCT Pub. No.: WO2018/122947
PCT Pub. Date: Jul. 5, 2018

(65) Prior Publication Data
US 2019/0144980 A1    May 16, 2019

(51) Int. Cl.
| | |
|---|---|
| *H01M 8/24* | (2016.01) |
| *C22C 38/28* | (2006.01) |
| *C22C 38/04* | (2006.01) |
| *C22C 38/06* | (2006.01) |
| *C22C 38/22* | (2006.01) |
| *H01M 8/021* | (2016.01) |
| *C22C 38/26* | (2006.01) |
| *H01M 8/124* | (2016.01) |

(52) U.S. Cl.
CPC ............. *C22C 38/28* (2013.01); *C22C 38/04* (2013.01); *C22C 38/06* (2013.01); *C22C 38/22* (2013.01); *C22C 38/26* (2013.01); *H01M 8/021* (2013.01); *H01M 2008/1293* (2013.01)

(58) Field of Classification Search
CPC .......... H01M 2008/1293; H01M 8/021; C22C 38/28; C22C 38/04; C22C 38/06; C22C 38/22; C22C 38/26
See application file for complete search history.

(56) References Cited

U.S. PATENT DOCUMENTS

| | | |
|---|---|---|
| 2002/0172853 A1 | 11/2002 | Kamo et al. |
| 2006/0285993 A1 | 12/2006 | Rakowski |
| 2006/0286432 A1 | 12/2006 | Rakowski et al. |
| 2006/0286433 A1 | 12/2006 | Rakowski et al. |
| 2008/0131739 A1 | 6/2008 | Badding et al. |
| 2010/0000636 A1 | 1/2010 | Bonnefois et al. |
| 2011/0229803 A1 | 9/2011 | Rakowski et al. |
| 2014/0106243 A1 | 4/2014 | Takenaka et al. |
| 2015/0167135 A1 | 6/2015 | Bonnefois et al. |
| 2015/0191809 A1* | 7/2015 | Hashizume ........... C22C 38/004 148/609 |
| 2016/0115562 A1 | 4/2016 | Santacreu et al. |
| 2018/0080106 A1* | 3/2018 | Teraoka ................. C22C 38/58 |
| 2019/0226068 A1 | 7/2019 | Bonnefois et al. |

FOREIGN PATENT DOCUMENTS

| | | | |
|---|---|---|---|
| CN | 101199072 A | | 6/2008 |
| CN | 101501234 A | | 8/2009 |
| CN | 104903482 A | | 9/2015 |
| CN | 105980613 A | | 9/2016 |
| JP | S58-129788 A | | 8/1983 |
| JP | 2008-285731 A | | 11/2008 |
| JP | 2009-231150 A | | 10/2009 |
| JP | 2010-511996 A | | 4/2010 |
| JP | 2011-204417 A | | 10/2011 |
| JP | 2011204417 A | * | 10/2011 |
| JP | 2012-67391 A | | 4/2012 |
| JP | 2012-243722 A | | 12/2012 |
| JP | 2013-118178 A | | 6/2013 |
| JP | 2013-152068 A | | 8/2013 |
| JP | 2016-066581 A | | 4/2016 |
| JP | 2016-128591 A | | 7/2016 |
| JP | 2016-207630 A | | 12/2016 |

OTHER PUBLICATIONS

Office Action dated Nov. 19, 2019, issued in counterpart GB application No. 1818588.4. (4 pages).
Office Action dated Nov. 5, 2019, issued in counterpart JP application No. 2018-558553, with English translation. (9 pages).
Fanmao Meng, Junyan Fu, "Modern Niobium-containing Stainless Steel"—Metallurgical Industry Press, Mar. 2004 (with English language abstract); Cited in CN Office Action dated Mar. 20, 2020. (7 pages).

(Continued)

*Primary Examiner* — Raymond Alejandro
(74) *Attorney, Agent, or Firm* — Westerman, Hattori, Daniels & Adrian, LLP (57) ABSTRACT

The present invention provides a stainless steel including 21 to 23% by mass of Cr, 0.2 to 0.4% by mass of Mn, 1.0 to 2.0% by mass of Mo, 0.08 to 2.0% by mass or Al, 0.01 to 0.2% by mass of Ti, and 0.2 to 0.5% by mass of Nb, with the balance being Fe and inevitable impurities; an interconnector of a fuel cell or a base material for holding a cell of a fuel cell made of this stainless steel; and a solid oxide fuel cell including this interconnector or this base material for holding a cell.

2 Claims, 7 Drawing Sheets

(56) References Cited

OTHER PUBLICATIONS

Office Action dated Mar. 20, 2020, issued in counterpart CN application No. 201680086238.8. (25 pages).
International Search Report dated Apr. 4, 2017, issued in counterpart application No. PCT/JP2016/088842, w/English translation (5 pages).
Written Opinion dated Apr. 4, 2017, issued in counterpart application No. PCT/JP2016/088842 (3 pages).
"NSS 445M2 Ferritic Marine Grade Stainless Steel", Wakefield Metals, [online], May 2006, [retrieval date: Mar. 27, 2017], Internet: URL:http://micometals.co.nz/files/7414/3528/8471/Grade445M2.pdf>, p. 3, Table 1, cited in ISR. (16 pages).

* cited by examiner

STAINLESS STEEL

TECHNICAL FIELD

The present invention relates to a stainless steel, and more specifically, the present invention relates to a stainless steel to be used as a material of an interconnector of a fuel cell or a base material for holding a cell of a fuel cell.

BACKGROUND ART

A solid oxide fuel cell is high in power generation efficiency, does not require a catalyst, and is responsible to various fuels, such as natural gas, kerosene, etc., and is also applicable to wide-ranging uses, such as household use, automobile use, power plant use, etc.

An interconnector which is used for the solid oxide fuel cell is a member which electrically connects single cells of the solid oxide fuel cell to each other. In view of the matter that the solid oxide fuel cell operates at high temperatures, various characteristics are required for a material of the interconnector. In addition, with respect to a base material for holding a cell of the fuel cell, various characteristics are also similarly required.

For example, Patent Document 1 describes that from the viewpoint of contact resistance, a stainless steel including predetermined amounts of Cr, Mo, Mn, Al, Ti, and Nb is suitable for the interconnector.

In addition, Patent Document 2 describes that from the viewpoint of preventing Cr poisoning (a phenomenon in which the performance of a fuel cell is lowered by chromium vaporized at high temperatures), a stainless steel including predetermined amounts of Cr, Mn, C, and Si is suitable for the interconnector.

PRIOR ART DOCUMENT

Patent Document

Patent Document 1: JP-A-2012-67391
Patent Document 2: JP-A-2013-118178

SUMMARY OF INVENTION

Problems to be Solved by the Invention

However, the conventional stainless steels were not excellent in all of viewpoints of oxidation resistance, electrical conductivity, processability, high-temperature strength, and Cr scattering properties.

A problem to be solved by the present invention is to provide a stainless steel which is excellent in all of viewpoints of oxidation resistance, electrical conductivity, processability, high-temperature strength, and Cr scattering properties; an interconnector of a fuel cell or a base material for holding a cell of a fuel cell, including this stainless steel; and a solid oxide fuel cell including this interconnector or this base material for holding a cell.

Means for Solving the Problems

The present invention provides the following embodiments.
A first embodiment is concerned with a stainless steel including:
21 to 23% by mass of Cr,
0.2 to 0.4% by mass of Mn,
1.0 to 2.0% by mass of Mo,
0.08 to 2.0% by mass of Al,
0.01 to 0.2% by mass of Ti, and
0.2 to 0.5% by mass of Nb,
with the balance being Fe and inevitable impurities.
A second embodiment is concerned with the stainless steel of the first embodiment, further including:
0 to 0.030% by mass of C, and
0.1 to 1.0% by mass of Si.
A third embodiment is concerned with an interconnector of a fuel cell or a base material for holding a cell of a fuel cell, including the stainless steel as set forth in the first embodiment or the second embodiment.
A fourth embodiment is concerned with a solid oxide fuel cell including the interconnector or the base material for holding a cell as set forth in the third embodiment.

Effects of the Invention

In accordance with the present invention, it is possible to provide a stainless steel which is excellent in all of viewpoints of oxidation resistance, electrical conductivity, processability, high-temperature strength, and Cr scattering properties; an interconnector of a fuel cell or a base material for holding a cell of a fuel cell made of this stainless steel; and a solid oxide fuel cell including this interconnector or this base material for holding a cell.

EMBODIMENTS FOR CARRYING OUT THE INVENTION

[Stainless Steel]
The stainless steel of the present invention includes:
21 to 23% by mass of Cr,
0.2 to 0.4% by mass of Mn,
1.0 to 2.0% by mass of Mo,
0.08 to 2.0% by mass of Al,
0.01 to 0.2% by mass of Ti, and
0.2 to 0.5% by mass of Nb,
with the balance being Fe and inevitable impurities.
The stainless steel of the present invention is preferably used for an interconnector of a fuel cell or a base material for holding a cell of a fuel cell.
In the stainless steel of the present invention, the content of Cr (chromium) is 21 to 23% by mass, preferably 21.5 to 23.4% by mass, and more preferably 22% by mass. When the content of Cr is 21 to 23% by mass, there is brought an effect for making both oxidation resistance and costs compatible with each other.

In the stainless steel of the present invention, the content of Mn (manganese) is 0.2 to 0.4% by mass, and preferably 0.2 to 0.35% by mass. When the content of Mn is 0.2% by mass or more, the Cr scattering amount can be decreased, and deterioration of the performance to be caused due to Cr poisoning can be reduced. When the content of Mn is 0.4% by mass or less, the electrical conductivity can be enhanced.

In the stainless steel of the present invention, the content of Mo (molybdenum) is 1.0 to 2.0% by mass, and preferably 1.2 to 2.0% by mass. When the content of Mo is 1.0% by mass or more, the oxidation resistance can be improved. When the content of Mo is 2.0% by mass or less, precipitation of an α-phase or a χ-phase can be suppressed, and processability and corrosion resistance can be improved.

In the stainless steel of the present invention, the content of Al (aluminum) is 0.08 to 2.0% by mass, and preferably 0.08 to 1.0% by mass. When the content of Al is 0.08% by mass or more, the oxidation resistance (in particular, steam oxidation resistance) can be improved, and at the same time, the Cr scattering amount can be decreased. When the content of Al is 2.0% by mass or less, the electrical conductivity can be improved.

In the stainless steel of the present invention, the content of Ti (titanium) is 0.01 to 0.2% by mass. When the content of Ti is 0.01% by mass or more, grain refinement is promoted, and a Lankford value (r value) that is an index for corrosion resistance, intergranular corrosion resistance, and deep drawability can be improved, and therefore, the processability can be improved. In addition, in the case where both Ti and Nb are included, when the content of Ti is 0.2% by mass or less, the solid-solved Ti amount can be suppressed, a lowering of uniform elongation can be prevented from occurring, and the formation of a coarse Ti-based precipitate can be suppressed, the generation of a start point of crack at the time of hole expansion processing can be reduced, and therefore, the processability is excellent.

In the stainless steel of the present invention, the content of Nb (niobium) is 0.2 to 0.5% by mass, and preferably 0.2 to 0.3% by mass. When the content of Nb is 0.2% by mass or more, the high-temperature strength, the corrosion resistance, and the oxidation resistance can be improved due to solid-solution strengthening and precipitate refinement strengthening. When the content of Nb is 0.5% by mass or less, a lowering of uniform elongation can be prevented from occurring, and a lowering of hole expandability can be suppressed, and therefore, the processability is excellent, and a lowering of pitting corrosion potential can also be suppressed.

The present inventors have found that when Ti and Nb are included in amounts in the above-described specified ranges, a synergistic effect of Ti and Nb is exhibited, and in particular, processability and weldability become favorable.

In the stainless steel of the present invention, the total content of Ti and Nb is preferably 0.21 to 0.7% by mass, more preferably 0.21 to 0.6% by mass, still more preferably 0.3 to 0.6% by mass, and especially preferably 0.4 to 0.6% by mass.

The elements included in the stainless steel of the present invention are those described above, and the balance is Fe (iron) and inevitable impurities. Examples of the inevitable impurities include O (oxygen), N (nitrogen), P (phosphorus), S (sulfur), and the like.

In addition, the stainless steel of the present invention may further include other element in addition to the above-described elements.

The element which may be included is hereunder described.

The stainless steel of the present invention may also include C (carbon) in an amount of 0 to 0.030% by mass. The content of C is preferably 0 to 0.020% by mass.

The stainless steel of the present invention may include Si (silicon) in an amount of 0.1 to 1.0% by mass. In the case where Si is included, the content of Si is preferably 0.1 to 0.4% by mass.

The stainless steel of the present invention can be produced by utilizing a general production process of stainless steel.

Although the shape of the stainless steel of the present invention is not particularly limited, in the case where the stainless steel is used for an interconnector or a base material for holding a cell, for the purpose of making it easy to fabricate the interconnector or the base material for holding a cell, it is preferred that the stainless steel is, for example, in a plate-like shape. Although the plate thickness is not particularly limited and can be properly set, it may be set to, for example, 0.05 to 3 mm or the like.

[Interconnector]

The interconnector of the present invention is one made of the above-described stainless steel of the present invention. Specifically, it is preferred that the interconnector is fabricated by subjecting the above-described stainless steel to molding processing or the like.

The shape of the interconnector is not particularly limited so far as it is able to electrically connect single cells of a solid oxidation fuel cell to each other, and all of known shapes of interconnector may be adopted, and examples thereof include a flat plate type, a cylindrical type, and the like. In addition, in the case of a flat plate type, ones having a gas channel are preferred. Examples thereof include a plate having at least one groove on at least one surface thereof (see an interconnector 1 in FIG. 1), a plate in which at least one surface thereof is wavy, a plate having at least one projection on at least one surface thereof, a porous plate, and the like.

[Base Material for Holding Cell]

The base material for holding a cell of the present invention is one made of the above-described stainless steel of the present invention. Specifically, it is preferred that the base material is fabricated by subjecting the above-described stainless steel to molding processing or the like.

The shape of the base material for holding a cell is not particularly limited, and all of known shapes of base material for holding a cell may be adopted. Examples thereof include a flat plate type and the like.

[Solid Oxide Fuel Cell]

The solid oxide fuel cell of the present invention is a solid oxide fuel cell including the above-described interconnector or the above-described base material for holding a cell.

The solid oxide fuel cell of the present invention may include either one or both of the above-described interconnector or the above-described base material for holding a cell, respectively.

Members other than the above-described interconnector or the above-described base material for holding a cell of the solid oxide fuel cell are not particularly limited, and known members can be used.

An example of the solid oxide fuel cell is described in more detail by reference to a drawing.

Figure 1:
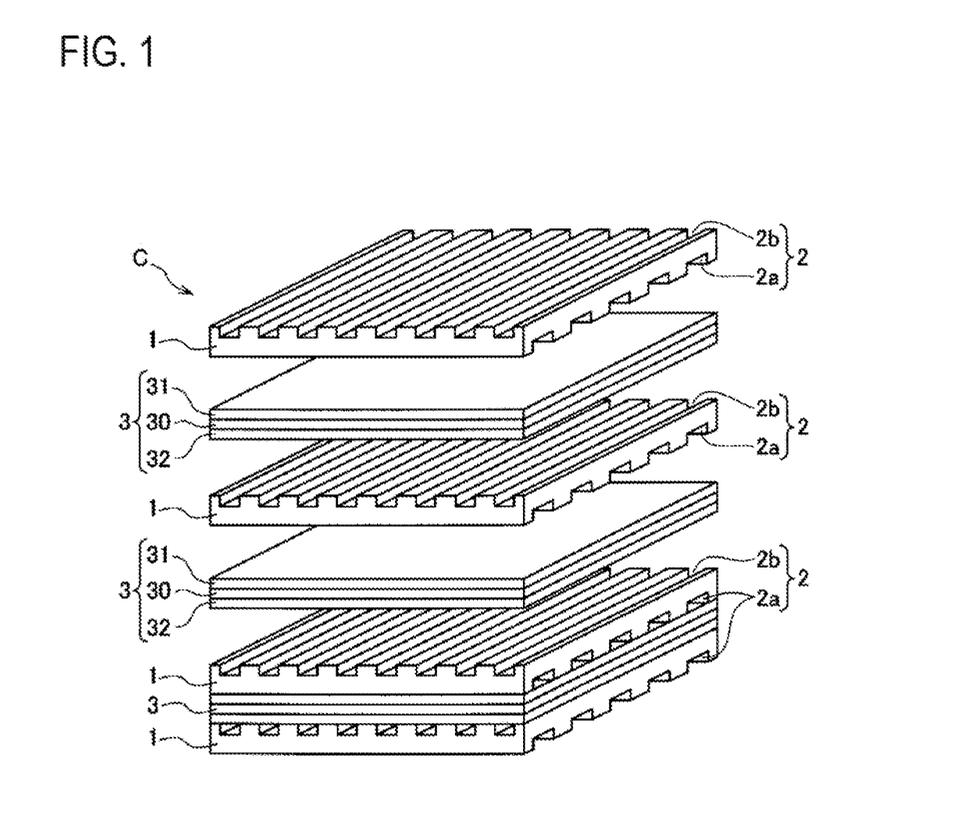
FIG. 1 is a schematic view showing an example of a solid oxide fuel cell.
Figure 2:
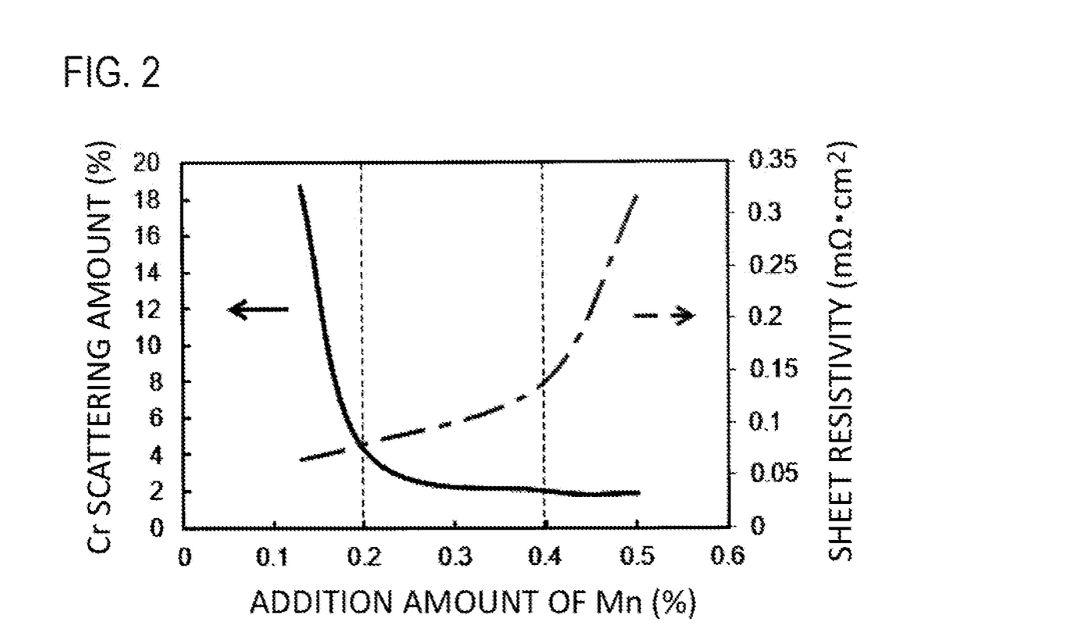
FIG. 2 is a graph showing a relation between an addition amount of Mn and a Cr scattering amount or a sheet resistivity.
Figure 3:
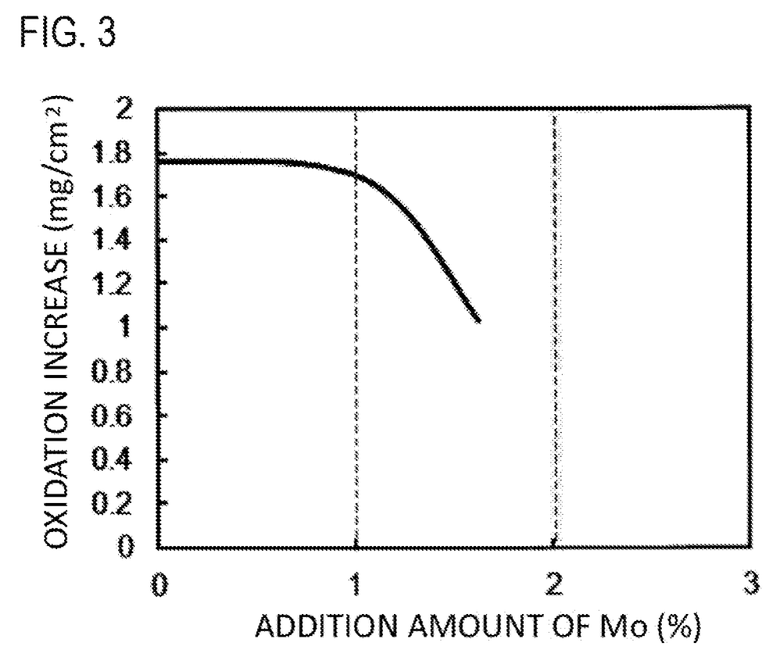
FIG. 3 is a graph showing a relation between an addition amount of Mo and an oxidation increase.
Figure 4:
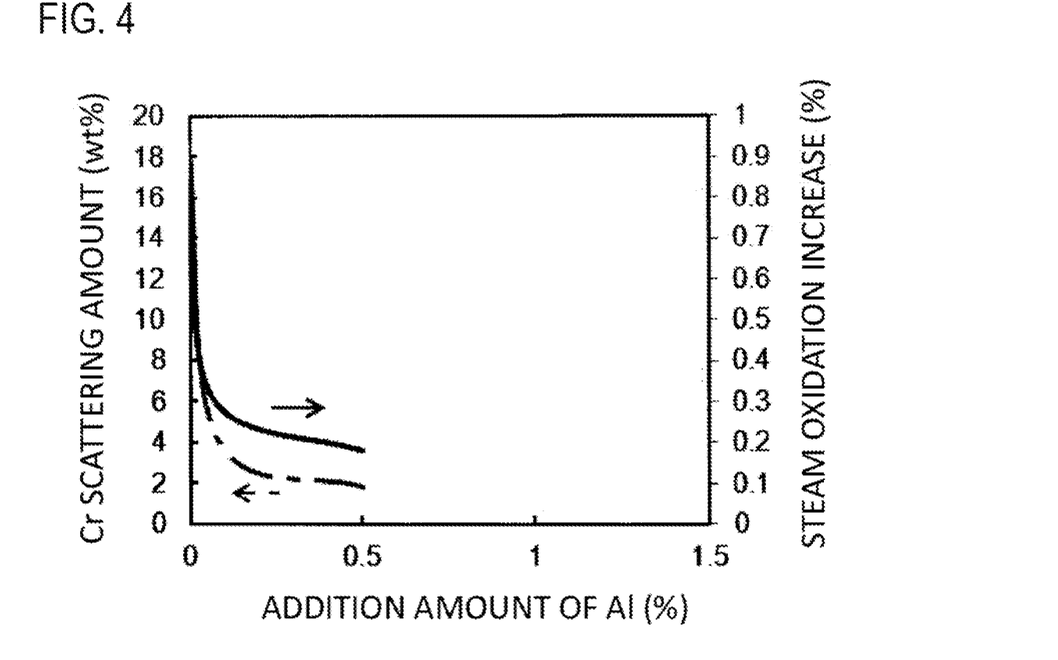
FIG. 4 is a graph showing a relation between an addition amount of Al and a Cr scattering amount or a steam oxidation increase.
Figure 5:
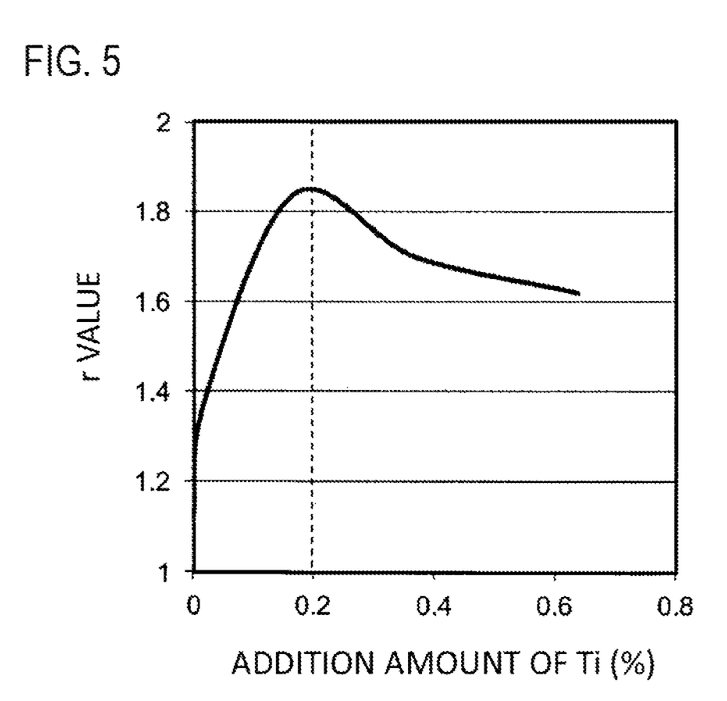
FIG. 5 is a graph showing a relation between an addition amount of Ti and an r value.
Figure 6:
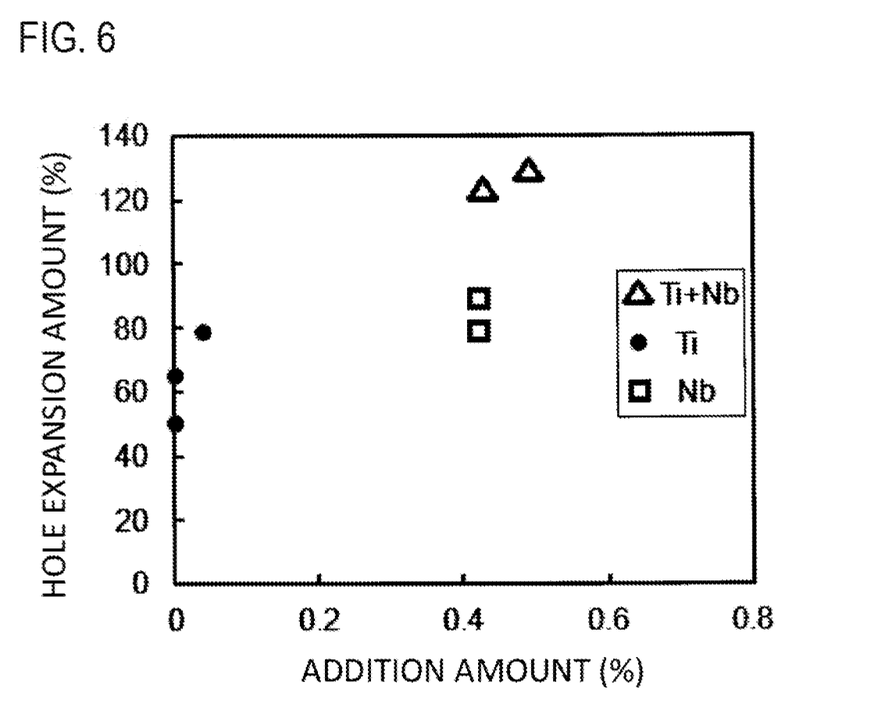
FIG. 6 is a graph showing a relation between an addition amount of Ti, Nb, or Ti+Nb and a hole expansion amount.
Figure 7:
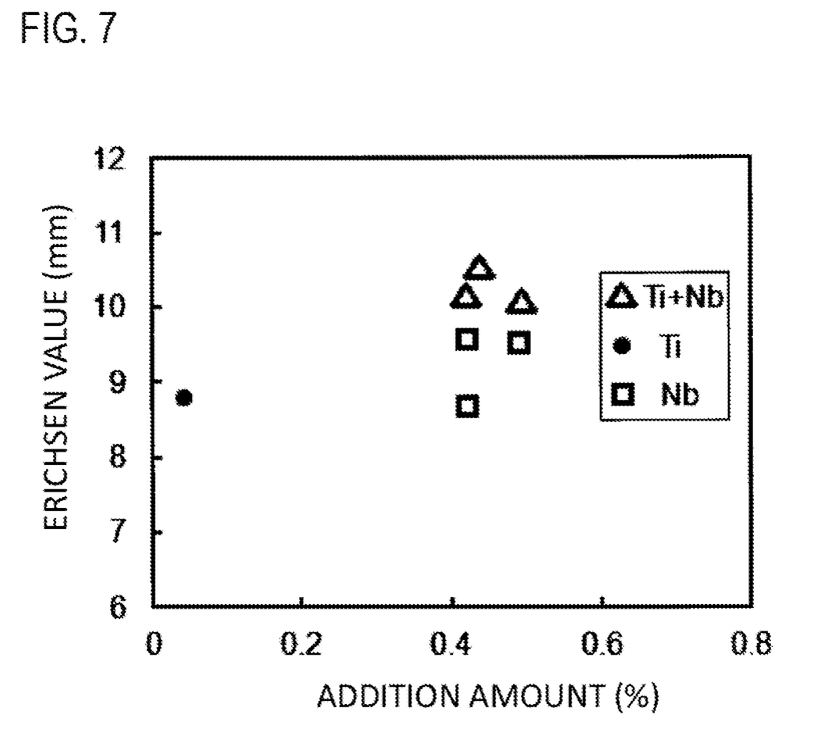
FIG. 7 is a graph showing a relation between an addition amount of Ti, Nb, or Ti+Nb and an Erichsen value.

A cell C for solid oxide fuel cell shown in FIG. 1 is provided with a single cell 3 in which an air electrode 31 is welded on one surface side of an electrolyte membrane 30 made of a dense body of an oxide ion conductive solid oxide, and the same time, a fuel electrode 32 is welded on the other surface side of the electrolyte membrane 30.

Furthermore, the cell C for solid oxide fuel cell has a structure in which this single cell 3 is sandwiched by interconnectors 1 in which grooves 2 for giving and receiving an electron as well as feeding air and hydrogen against the air electrode 31 or the fuel electrode 32 are formed. The above-described grooves 2 on the side of the air electrode 31 function as air channels 2a for feeding air into the air electrode 31 due to the matter that the air electrode 31 and the interconnector 1 are tightly disposed; whereas the above-described groves 2 on the side of the fuel electrode 32 function as fuel channels 2b for feeding hydrogen into the fuel electrode 32 due to the matter that the fuel electrode 32 and the interconnector 1 are tightly disposed.

Although a material of the air electrode 31 is not particularly limited, for example, a perovskite type oxide of (La, AE)MO$_3$ in which a part of La in LaMO$_3$ (for example, M=Mn, Fe, or Co) is substituted with an alkaline earth metal AE (AE=Sr or Ca) can be utilized; as a material of the above-described fuel electrode 32, a cermet between Ni and yttria stabilized zirconia (YSZ) can be utilized; and furthermore, as a material of the electrolyte membrane 30, yttria stabilized zirconia (YSZ) can be utilized.

A cell stack is fabricated in such a manner that in a state where the plural cells C for solid oxide fuel cell are laminated and disposed, a pressing force is give in the lamination direction by using plural bolts and nuts, whereby the plural cells C for solid oxide fuel cell are sandwiched.

In this cell stack, the interconnectors 1 disposed in the both end parts in the lamination direction may be an interconnector in which only one of the fuel channels 2b or the air channels 2a are formed, and as for the other interconnectors 1 disposed in the middle, an interconnector in which the fuel channels 2b are formed on one surface thereof, and the air channels 2a are formed on the other surface can be utilized.

The solid oxide fuel cell having such a structure of cell stack is generally called a flat plate-type solid oxide fuel cell. In the present embodiment, the flat plate-type solid oxide fuel cell is described as an example, but the present invention is also applicable with respect to solid oxide fuel cells having other structure.

During operation of the solid oxide fuel cell provided with such cell C for solid oxide fuel cell, air is fed via the air channels 2a formed in the interconnector 1 adjacent to the air electrode 31, and at the same time, hydrogen is fed via the fuel channels 2b formed in the interconnector 1 adjacent to the fuel electrode 32, whereby the solid oxide fuel cell is operated at an operating temperature of, for example, about 700° C. Then, in the air electrode 31, $O_2$ reacts with an electron e$^-$ to produce $O^{2-}$; the $O^{2-}$ passes through the electrolyte membrane 30 and moves to the fuel electrode 32; and in the fuel electrode 32, fed $H_2$ reacts with the $O^{2-}$ to produce $H_2O$ and e$^-$, whereby an electromotive force is generated between a pair of the interconnectors 1. By taking out the electromotive force, it can be utilized.

EXAMPLES

The present invention is more specifically described below by reference to Examples, but it should be construed that the scope of the present invention is not limited to the following specific examples.

Example 1 and Comparative Example 1

Stainless steel plates (plate thickness: 0.5 mm) having each of chemical compositions shown in the following Table 1 were produced by means of cold rolling.

TABLE 1

| | Chemical composition (% by mass) | | | | | | | | | | |
|---|---|---|---|---|---|---|---|---|---|---|---|
| | Cr | Mn | Mo | Al | Ti | Nb | C | Si | La | Cu | Fe and inevitable impurities |
| Example 1 | 22 | 0.2 | 1.23 | 0.08 | 0.19 | 0.25 | 0.01 | 0.21 | 0 | 0 | Balance |
| Comparative Example 1 | 22 | 0.5 | 0 | 0.5 or less | 0.04 | 0 | 0.03 or less | 0.5 or less | 0.06 | 0.5 or less | Balance |

[Evaluation]

The resulting stainless steel plates were used and evaluated by the following methods.

<Oxidation Resistance>

The oxidation resistance was evaluated by two kinds of atmospheric oxidation and steam oxidation.

The atmospheric oxidation was performed by heat treating the stainless steel plate in the air at 800° C. for 10,000 hours. A cross section of the stainless steel plate after the heat treatment in the plate thickness direction was observed with a scanning electron microscope (SEM), thereby measuring a film thickness of the oxide film.

The steam oxidation was performed by heat treating the stainless steel plate in a 100% steam at 800° C. for 10,000 hours. A cross section of the stainless steel plate after the heat treatment in the plate thickness direction was observed with a scanning electron microscope (SEM), thereby measuring a film thickness of the oxide film.

<Electrical Conductivity>

A sheet resistivity was measured in a tube furnace at 700° C. by a four-terminal method.

<Processability>

The processability was evaluated in terms of two kinds of an Erichsen value and a hole expansion value.

As for the Erichsen value, the stainless steel plate (test piece) fixed between a blank holder and a die was clamped at a fixed speed and pushed up by a spherical head punch to form a depression, a height (depth) was measured until a crack was generated in the depression, and this value was defined as the Erichsen value. The higher the Erichsen value, the more excellent the moldability is.

The hole expansion value was measured by a hole expanding test (JIS2256). The larger the hole expansion value, the more excellent the processability is.

<High-Temperature Strength>

The high-temperature strength was evaluated in terms of two kinds of a tensile strength at 700° C. and a 0.2% proof strength at 700° C.

<Cr Scattering Properties>

With respect to the Cr amount of a deposit attached onto a plate-shaped test piece of 25 mm in square opposite to a stainless steel plate sample of 18 mm in square having been heated and held at 800° C. for 500 hours, an SEM-EDS analysis was performed to measure the scattering amount of Cr.

TABLE 2

| | Oxidation resistance | | | Processability | | High-temperature strength | | Cr scattering properties |
|---|---|---|---|---|---|---|---|---|
| | Atmospheric oxidation Thickness of oxide film | Steam oxidation Thickness of oxide film | Electrical conductivity Sheet resistivity | Erichsen value | Hole expansion value | Tensile strength (700° C.) | 0.2% proof strength (700° C.) | Cr scattering amount (800° C. × 500 hr) |
| Example 1 | 11 μm | 6 μm | 92 mΩ · cm² | 9.5 mm | 117% | 220 MPa | 177 MPa | 1.8% by mass |
| Comparative Example 1 | 18 μm | 13 μm | 275 mΩ · cm² | 8.7 mm | 79% | 50 MPa | 50 MPa | 4.2% by mass |

From the above-described Table 2, as compared with the stainless steel of Comparative Example 1, the stainless steel of Example 1 is high in the oxidation resistance, high in the electrical conductivity, excellent in the processability, high in the high-temperature strength, and low in the Cr scattering amount, and desirable in the Cr scattering properties. Accordingly, the stainless steel of Example 1 is suitable as a stainless steel to be used for an interconnector of a fuel cell or a base material for holding a cell of a fuel cell.

In addition, in the stainless steel, changes in performances in the case of changing each of the contents of Mn, Mo, Al, Ti, Nb, and Ti+Nb are shown FIGS. 2 to 7.

INDUSTRIAL APPLICABILITY

In accordance with the present invention, it is possible to provide a stainless steel which is excellent in all of viewpoints of oxidation resistance, electrical conductivity, processability, high-temperature strength, and Cr scattering properties; an interconnector of a fuel cell or a base material for holding a cell of a fuel cell made of this stainless steel; and a solid oxide fuel cell including this interconnector or this base material for holding a cell.

REFERENCE SIGNS LIST

1: Interconnector
2: Groove
2a: Air channel
2b: Fuel channel
3: Single cell
30: Electrolyte membrane
31: Air electrode
32: Fuel electrode
C: Cell for solid oxide fuel cell

The invention claimed is:

1. A fuel cell comprising:
a plurality of cells,
at least one interconnector between the plurality of cells, and
at least one base material for holding the plurality of cells,
wherein at least one of the at least one interconnector and the at least one base material comprises a stainless steel comprising:
21 to 23% by mass of Cr,
0.2 to 0.4% by mass of Mn,
1.0 to 2.0% by mass of Mo,
0.08 to 2.0% by mass of Al,
0.01 to 0.2% by mass of Ti,
0.2 to 0.5% by mass of Nb, and
0.21 to 1.0% by mass of Si,
with the balance being Fe and inevitable impurities.
2. The fuel cell according to claim 1, wherein an upper limit of the Si content is 0.4% by mass.

* * * * *